(12) United States Patent
Waku et al.

(10) Patent No.: US 7,576,457 B2
(45) Date of Patent: Aug. 18, 2009

(54) ELECTRIC POWER STEERING APPARATUS

(75) Inventors: Osamu Waku, Tokyo (JP); Masatoshi Fujimoto, Tokyo (JP); Masafumi Okazaki, Tokyo (JP); Kyohei Yamamoto, Tokyo (JP); Masayoshi Yamamoto, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 483 days.

(21) Appl. No.: 11/493,597

(22) Filed: Jul. 27, 2006

(65) Prior Publication Data

US 2007/0024152 A1 Feb. 1, 2007

(30) Foreign Application Priority Data

Jul. 28, 2005 (JP) .......................... P2005-218691

(51) Int. Cl.
*H02K 5/24* (2006.01)
*H02K 1/22* (2006.01)
(52) U.S. Cl. ......................................... 310/51; 310/261
(58) Field of Classification Search .................. 310/51, 310/261
See application file for complete search history.

(56) References Cited

U.S. PATENT DOCUMENTS 6,435,971 B2 * 8/2002 Tanaka ......................... 464/29

FOREIGN PATENT DOCUMENTS

| JP | 3-176212 A | 7/1991 |
|---|---|---|
| JP | 3-178870 A | 8/1991 |
| JP | 3-178872 A | 8/1991 |
| JP | 5-220641 A | 8/1993 |
| JP | 8-47213 A | 2/1996 |
| JP | 2001-8402 | 1/2001 |
| JP | 2001-8402 A | 1/2001 |
| JP | 2001008402 * | 1/2001 |
| JP | 2002-369443 A | 12/2002 |
| JP | 2004-60785 A | 2/2004 |
| JP | 2005-80399 A | 3/2005 |

OTHER PUBLICATIONS

English-language machine translation of the Japanese reference JP 2001008402 on Jan. 7, 2009.*
Japanese Office Action and English translation dated Jan. 8, 2008.
Japanese Office Action dated Jun. 24, 2008.

* cited by examiner

*Primary Examiner*—Quyen Leung
*Assistant Examiner*—Leda Pham
(74) *Attorney, Agent, or Firm*—Sughrue Mion, PLLC

(57) ABSTRACT

An electric power steering apparatus includes; a DC brush motor, and a boss arranged between an output shaft of the motor and an input shaft driven by the motor, for transmitting a rotational force of the motor from the output shaft to the input shaft by the boss per se. A weight of the boss is equal to or larger than 10% of a weight of a rotor of the motor. An electric power steering apparatus includes; a DC brush motor and a boss arranged between the output shaft of the motor and the input shaft driven by the motor, for transmitting the rotational force of the motor from the output shaft to the input shaft by the boss per se. A moment of inertia of the boss is equal to or larger than 10% of a moment of inertia of the rotor of the motor.

16 Claims, 5 Drawing Sheets

ELECTRIC POWER STEERING APPARATUS

BACKGROUND

1. Technical Field

The present invention relates to an electric power steering apparatus for assisting a steering force of steering of a vehicle by a motor.

2. Description of Related Art

There is provided an apparatus of a related art in which an armature is rotated along with an output shaft by electromagnetic operation by supplying a current from a lead wire to a wiring by way of a brush brought into contact with a commutator, a front end portion of the output shaft is press-fitted to a hole for press-fitting of a connecting member, or an input shaft is coupled to a spline hole of a connecting member by a spline and therefore, a rotational torque of the output shaft is transmitted to the input shaft for assisting a steering force for steering (refer to, for example, JP-A-2001-8402 (paragraphs [0018]-[0024], FIG. 1)).

SUMMARY OF INVENTION

In the relate art, low noise formation is requested for a motor for an electric power steering apparatus, and the low noise formation is achieved by reducing transmission of noise of the brush by stabilizing sliding movement of the brush and the commutator by adding a step of running in the motor, or floatingly attaching a brush holder by adding an elastic member of rubber or the like. However, further low noise formation is requested for the motor for the electric power steering apparatus, particularly, in an electric power steering apparatus of a column type of attaching the motor to a column, a distance between the motor and a driver is short and therefore, further low noise formation is particularly needed.

The invention has been carried out in order to resolve the above-described problem and it is an object thereof to provide an electric power steering apparatus capable of reducing noise of a DC brush motor by a simple constitution and inexpensively.

According to an aspect of the invention, there is provided an electric power steering apparatus including a DC brush motor, and a boss arranged between an output shaft of the motor and an input shaft driven by the motor for transmitting a rotational force of the motor from the output shaft to the input shaft by the boss per se, wherein a weight of the boss is made to be equal to or larger than 10% of a weight of a rotor of the motor.

According to another aspect of the invention, there is provided an electric power steering apparatus including a DC brush motor, and a boss arranged between an output shaft of the motor and an input shaft driven by the motor for transmitting a rotational force of the motor from the output shaft to the input shaft by the boss per se, wherein a moment of inertia of the boss is made to be equal to or larger than 10% of a moment of inertia of a rotor of the motor.

According to the above-aspects, the weight of the boss is made to be equal to or lager than 10% of the weight of the rotor of the motor and therefore, the electric power steering apparatus reducing noise of the DC brush motor can be provided by a simple constitution and inexpensively.

According to the above-aspects, the moment of inertia of the boss is made to be equal to or larger than 10% of the moment of inertia of the rotor of the motor and therefore, the electric power steering apparatus reducing noise of the DC brush motor can be provided by a simple constitution and inexpensively.

DESCRIPTION OF THE EMBODIMENTS

Embodiment 1

Figure 1:
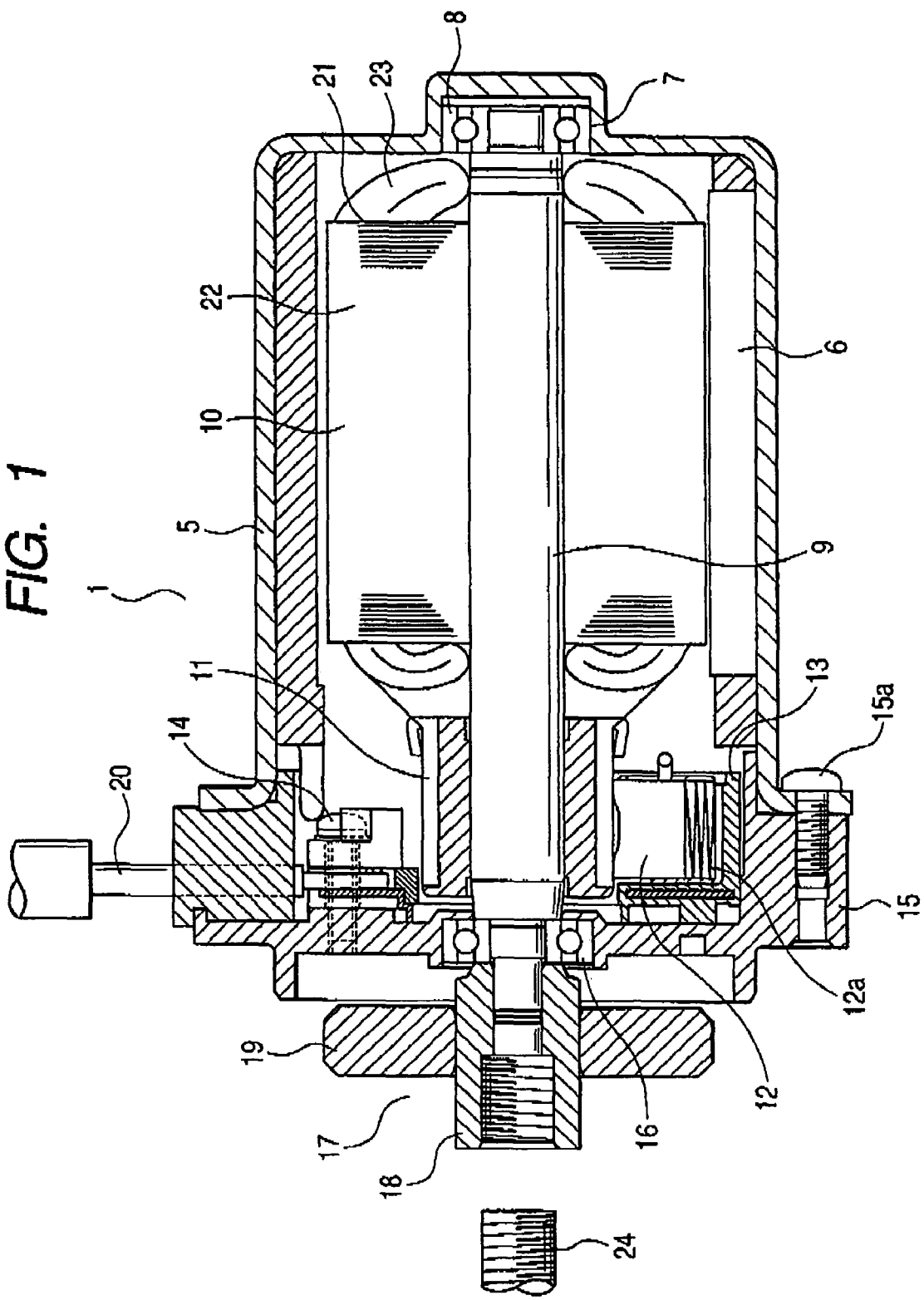
FIG. 1 is a sectional view of a DC brush motor for an electric power steering apparatus showing Embodiment 1 of the Invention.
Figure 2:
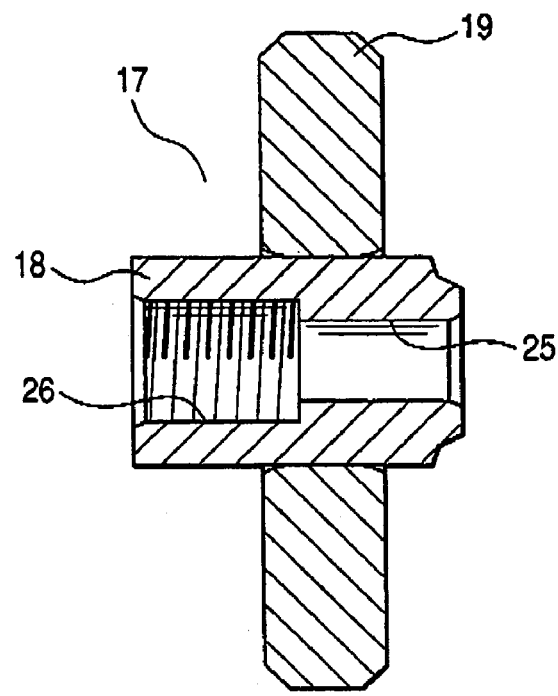
FIG. 2 is a sectional view of a boss showing Embodiment 1 of the invention.
Figure 4:
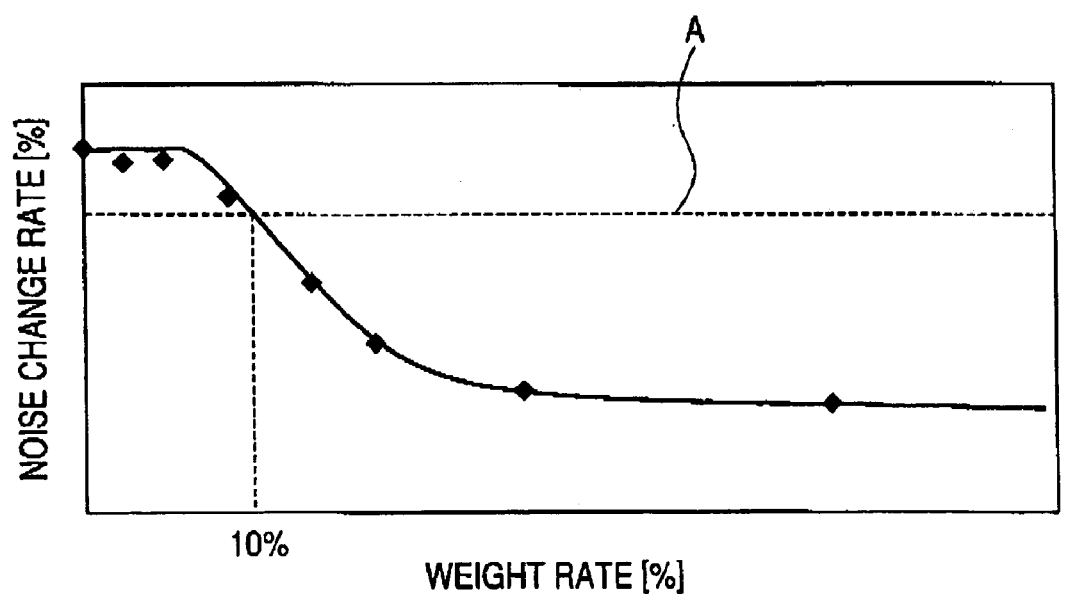
FIG. 4 is an explanatory diagram showing a noise change rate relative to a weight rate showing Embodiment 1 of the invention.
Figure 3:
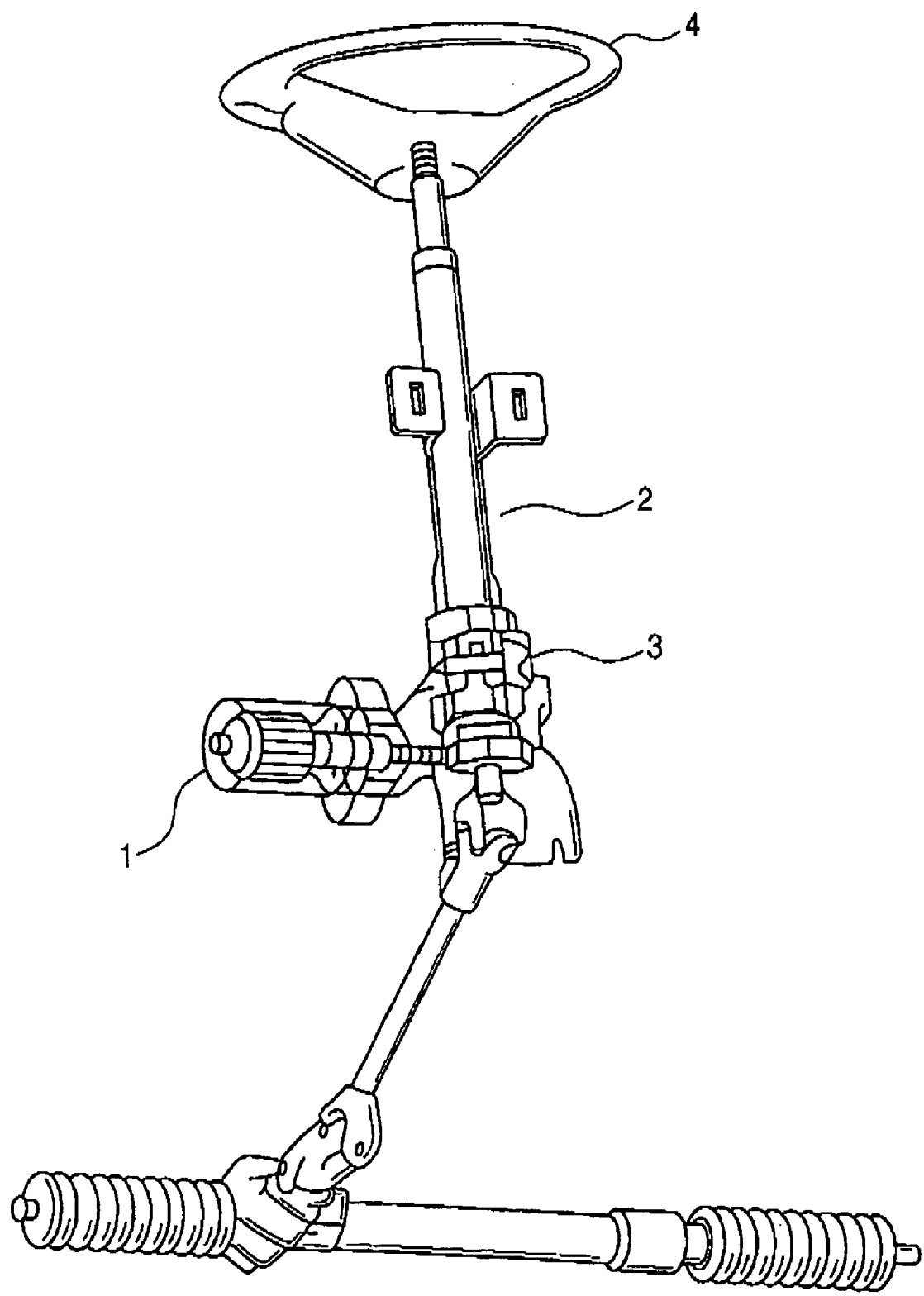
FIG. 3 is a perspective view showing a behavior of attaching the DC brush motor showing Embodiment 1 of the invention.

Embodiment 1 will be explained in reference to FIG. 1 through FIG. 4. FIG. 1 is a sectional view of a DC brush motor for an electric power steering apparatus, FIG. 2 is a sectional view of a boss shown in FIG. 1, and FIG. 3 is a perspective view showing a behavior of attaching the DC brush motor to the electric power steering apparatus. FIG. 4 is an explanatory diagram showing a noise change rate relative to a weight rate. In FIG. 3, a DC brush motor 1 for the electric power steering apparatus is a motor for an electric power steering apparatus of a so-to-speak column type connected to be attached to a gear box 3 attached to a column 2, the DC brush motor 1 is arranged at inside of a vehicular compartment and is constituted to assist a steering force of a steering wheel 4 of a driver by being controlled to be conducted by a control apparatus, not illustrated.

The DC brush motor 1 will be explained in reference to FIG. 1. An inner face of a yoke 5 in a shape of a bottomed cylinder is fixed with 4 poles of permanent magnets 6, an inner face of a bearing containing portion 7 formed integrally with the yoke 5 is contained with an outer ring of a first bearing 8 by so-to-speak clearance fitting having a clearance in view of assembling, and one end of an output shaft 9 is rotatably supported by the bearing 8. A brush 12 is brought into sliding contact with an outer peripheral face of a commutator 11 provided to an armature 10 having the output shaft 9 by being pressed by an elastic force of a spring 12a. A brush holder 13 holding the brush 12 is fixed to a housing 15 by a screw 14. A vicinity of other end of the output shaft 9 is rotatably supported by a second bearing 16 an outer ring of which is press-fitted to be fixed to the housing 15, and an opening side of the yoke 5 is fixed to the housing 15 by a screw 15a. A boss 17 is constituted by a boss main body 18 and a providing portion 19. The boss main body 18 is press-fitted to an end portion of the output shaft 9 slightly projected from the bearing 16 in an axial direction, the boss main body 18 and the output shaft 9 are brought into contact with both sides of end faces in the axial direction of an inner ring of the bearing 16 and integrally fixed thereto to pinch the inner ring of the bearing 16 in the axial direction by the boss main body 18 and the output shaft 9, and the output shaft 9 is constituted to be prevented from being moved in the axial direction.

A lead wire 20 for feeding electricity to the brush 12 is led out to outside of the DC brush motor 1 and is connected to a control apparatus, not illustrated. The armature 10 is constituted by press-fitting to fix a core 22 having 22 pieces of slots 21 to the output shaft 9, winding a wiring 23 around the slots 21 by a lap winding system and connecting the winding 23 to the commutator 11. The DC brush motor 1 is attached by fixing the housing 15 to the gear box 3 by a bolt, not illustrated, and the boss main body 18 is connected to an input shaft 24 provided to the gear box 3 to transmit a rotational force of the DC brush motor 1 to a side of the gear box 3.

In FIG. 2, according to the boss 17, the providing portion 19 in a shape of a doughnut is press-fitted to be fixed to an outer periphery of the boss main body 18. The boss main body 18 is formed by a sintered member, includes an inner diameter portion 25 for being press-fitted to the output shaft 9, and a spline hole 26 for connecting to the input shaft 24 and is constituted to provide a function of transmitting the rotational force of the DC brush motor 1 from the output shaft 9 to the input shaft 24 by the boss main body 18 per se. The providing portion 19 is constituted by forming an iron member in the doughnuts shape by cold forging, and the providing portion 19 per se does not transmit the rotational force of the DC brush motor 1 from the output shaft 9 to the input shaft 24.

In FIG. 4, the abscissa designates a weight rate (%) showing a rate of a weight of the boss 17 to a weight of a rotor of the DC brush motor 1 (boss weight/rotor weight), and the ordinate designates a noise change rate (%) when the weight rate (%) is changed, which is found by the inventors through an experiment. The weight of the rotor is a weight of a rotating portion excluding the weight of the boss 17 (weight of so-to-speak armature 10) and is a total sum of weights of the output shaft 9, the commutator 11, the core 22 and the winding 23 and the like. A broken line indicated by notation A in the drawing designates a level of noise constituting a target, and as shown by the drawing, noise can be reduced by increasing the weight rate (%) and low noise formation constituting a target can be achieved by making the weight rate equal to or larger than 10%. It seems that by providing a proper weight member to a counter core side (side of the boss 17) constituting a fulcrum by the bearing 16 relative to a portion of the core 22 occupying a large portion of the weight of the rotor, vibration of the armature 10 in a rotational direction or a bending direction thereof can be attenuated or cancelled, sliding movement of the brush 12 is stabilized, particularly, noise of the brush can be reduced. Further, although noise can effectively be reduced by constituting the weight rate (%) in a range in which a change in the noise change rate (%) relative to a change in the weight rate (%) is large, when the weight rate (%) is excessively increased more than necessary, an influence is effected on an increase in the weight of the apparatus, strengths of the output shaft 9 and the bearing 16 and the like, further, there is a concern of effecting an adverse influence on a steering feeling which is important for the electric power steering apparatus and therefore, it is preferable to set an upper limit in consideration of the point.

As described above, according to the electric power steering apparatus of Embodiment 1, there is provided the boss 17 arranged between the output shaft 9 of the motor 1 and the input shaft 24 driven by the motor 1 for transmitting the rotational force of the motor 1 from the output shaft 9 to the input shaft 24 by the boss 17 per se, the weight of the boss 17 is made to be equal to or larger than the weight of the rotor of the motor 1 and therefore, the electric power steering apparatus capable of reducing noise of the DC motor can be provided by a simple constitution and inexpensively. By increasing the weight of the boss 17, the electric power steering apparatus capable of being constituted inexpensively by minimizing addition of a new part or step and particularly reducing noise of brush can be provided.

Further, the boss 17 is constituted by fixing the providing portion 19 to the outer periphery of the boss 17 and therefore, a material and a shape of the providing portion 19 can freely be selected. Although the boss main body 18 is constituted to provide the function of transmitting the rotational force of the DC brush motor 1 from the output shaft 9 to the input shaft 24 by the boss main body 18 per se, a function of transmitting the rotational force is not needed for the providing portion 19 and therefore, the providing portion 19 can be constituted by a material having a large specific weight or an inexpensive material.

Further, when the DC brush motor 1 is constituted by the so-to-speak column type attached to the column 2, a vibration condition and a temperature condition are alleviated in comparison with a so-to-speak rack type in which the DC brush motor 1 is attached to a rack shaft and arranged in an engine compartment and therefore, the apparatus preferable for the column type can be provided such that the apparatus can be constituted with inconsiderable influence on the strength or the like by increasing the weight of the boss 17 or providing the providing portion 19 and inexpensively, the low noise formation can easily be achieved or the like.

Further, by constituting a total of the providing portion 19 by an elastic member of rubber or the like, transmission of vibration to the providing portion 19 or vibration of the providing portion 19 per se is restrained and noise can be reduced effectively.

Embodiment 2

Figure 5:
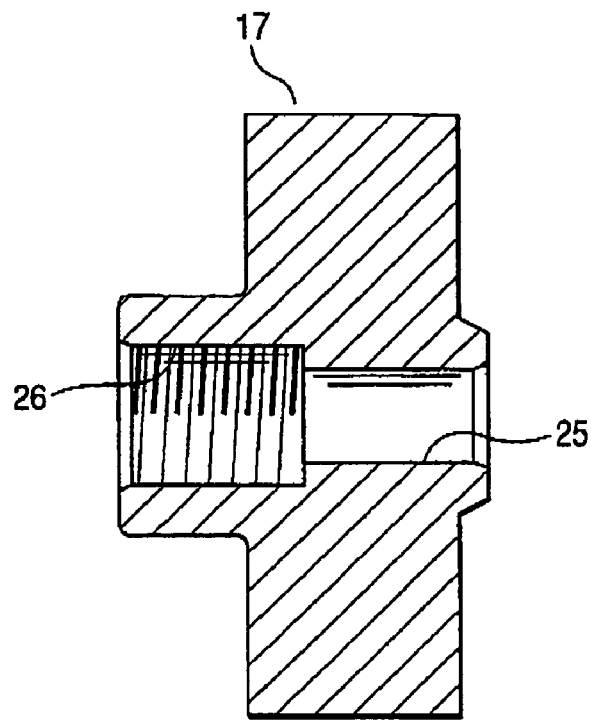
FIG. 5 is a sectional view of a boss showing embodiment 2 of the invention.
Figure 6:
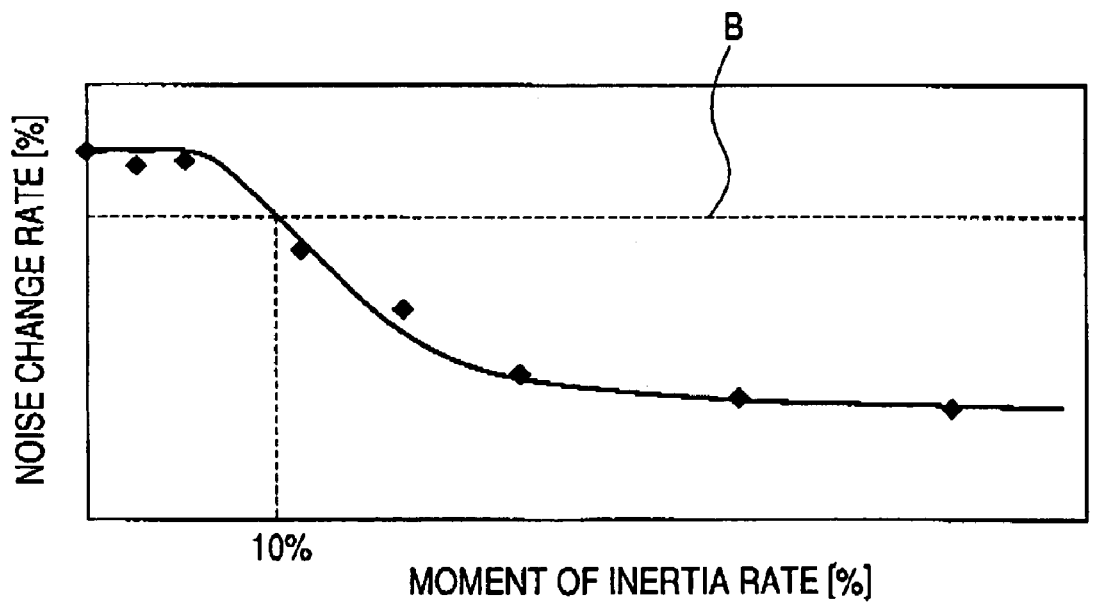
FIG. 6 is an explanatory diagram showing a noise change rate relative to a moment of inertia rate showing Embodiment 2 of the invention.

Embodiment 2 will be explained in reference to FIG. 5 and FIG. 6. FIG. 5 is a sectional view of a boss arranged to the DC brush motor for the electric power steering apparatus of FIG. 1 similar to FIG. 2, and FIG. 6 is an explanatory diagram showing a noise change rate relative to a moment of inertia rate. In FIG. 5, the boss 17 is constituted by an integrated product formed by a sintered member, includes the inner diameter portion 25 for being press-fitted to the output shaft 9 and the spline hole 26 for being connected to the input shaft 24, and is constituted to provide the function of transmitting the rotational force of the DC brush motor 1 from the output shaft 9 to the input shaft 24 by the boss 17 per se. The other constitution is constructed by a constitution similar to that of Embodiment 1 and a detailed explanation thereof will be omitted.

In FIG. 6, the abscissa designates a moment of inertia rate (%) showing a rate of a moment of inertia of the boss 17 to a moment of inertia of the rotor of the DC brush motor 1 (moment of inertia of boss/moment of inertia of rotor), and the ordinate designates the noise change rate (%) when the moment of inertia rate (%) is changed, which is found by the inventors through an experiment. The moment of inertia of the rotor is a moment of inertia of a rotating portion excluding the boss 17 (so-to-speak moment of inertia of armature). A broken line indicated by notation B in the drawing designates a level of noise constituting a target, as shown by the drawing, noise can be reduced by increasing the moment of inertia rate (%), and low noise formation constituting a target can be achieved by making the moment of inertia rate equal to or larger than 10%. It seems that vibration in the rotational direction or the bending direction of the armature 10 can be attenuated or cancelled by providing a proper moment of inertia to a counter core side (side of the boss 17) constituting a fulcrum by the bearing 16 relative to a portion of the core 22 occupying a large portion of the moment of inertia of the rotor, sliding movement of the brush 12 is stabilized and particularly, noise of the brush can be reduced. Further, although noise can effectively be reduced by constituting the moment of inertia rate (%) in a range in which a change in the noise change rate (%) relative to a change in the moment of inertia rate (%) is large, when the moment of inertia rate (%) is excessively increased more than necessary, an influence is effected on the strength or the like of the apparatus, particularly, there is a concern of effecting an adverse influence on a steering feeling of rotational following performance or the like important for the electric power steering apparatus and therefore, it is preferable to set an upper limit of the moment of inertia rate (%) to a degree of capable of compensating for the influence of the inertia by the control apparatus of the electric power steering apparatus.

As described above, according to the electric power steering apparatus of Embodiment 2, there is provided the boss 17 arranged between the DC brush motor 1 and the output shaft 9 of the motor 1 and the input shaft 24 driven by the motor for transmitting the rotational force of the motor 1 from the output shaft 9 to the input shaft 24 by the boss 17 per se, the moment of inertia of the boss 17 is made to be equal to or larger than 10% of the moment of inertia of the rotor of the motor 1 and therefore, the electric power steering apparatus capable of reducing noise of the DC brush motor 1 can be provided by a simple constitution and inexpensively. The electric power steering apparatus capable of being constituted inexpensively by minimizing addition of a new part or step and reducing particularly noise of the brush can be provided by increasing the moment of inertia of the boss 17, further, by constituting the boss 17 by increasing the diameter thereof, the moment of inertia can effectively be increased and an increase in the weight of the boss 17 can be restrained.

Further, the boss 17 is constituted by an integrated product formed by the sintered member and therefore, the boss 17 can inexpensively be constituted without an increase in a number of parts. Further, although a similar effect is achieved when the boss 17 is constituted by an integrated product formed by cold forging and can comparatively inexpensively be constituted in comparison with a case of integrally forming the boss 17 by the sintered member, an accuracy of the steering portion is frequently deteriorated slightly.

Further, although an explanation has been given of the boss 17 by providing the providing portion 19 in Embodiment 1 and an explanation has been given of the boss 17 by constituting the boss 17 by the integrated product formed by the sintered member in Embodiment 2, the constitution of the boss 17 may naturally be constituted by reversing Embodiment 1 and Embodiment 2.

Embodiment 3

Figure 7:
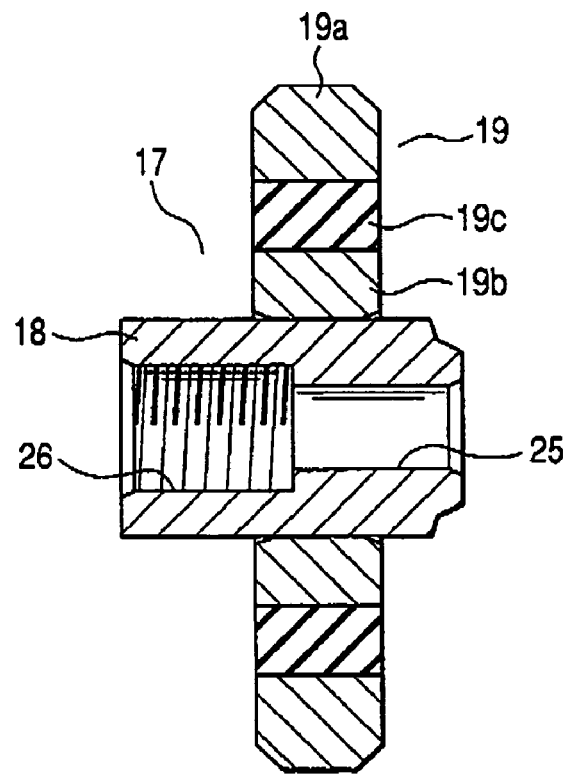
FIG. 7 is a sectional view of a boss showing Embodiment 3 of the invention.

Embodiment 3 will be explained in reference to FIG. 7. FIG. 7 is a sectional view of a boss arranged to the DC brush motor for the electric power steering apparatus of FIG. 1 similar to FIG. 2 or FIG. 5, the other constitution is constructed by a constitution similar to that of Embodiment 1 or Embodiment 2 and a detailed explanation thereof will be omitted. In FIG. 7, the boss 17 is fixed by press-fitting the inner periphery of the providing portion 19 in the doughnut shape to the outer periphery of the boss main body 18. The boss main body 18 is formed by a sintered member, includes the inner diameter portion 25 for being press-fitted to the output shaft 9 and the spline hole 26 for being connected to the input shaft 24 and is constituted to provide the function of transmitting the rotational force of the DC brush motor 1 from the output shaft 9 to the input shaft 24 by the boss main body 18 per se. The providing portion 19 is constituted by forming an iron member in the doughnut shape by cold forging, arranging two pieces (19a, 19b) thereof in a diameter direction and interposing an elastic member 19c having a viscoelasticity therebetween. Further, the providing portion 19 per se does not transmit the rotational force of the DC brush motor 1 from the output shaft 9 to the input shaft 24.

As described above, according to the electric power steering apparatus of Embodiment 3, the providing portion 19 is constituted by interposing the elastic member 19c at a portion of the providing portion 19 and therefore, transmission of vibration to the providing portion 19 or vibration of the providing portion 19 per se is restrained and noise can further effectively be reduced. The elastic member 19c may be interposed between an outer face of the boss member 18 and the providing portion 19b fixed thereto.

Embodiment 4

Figure 8:
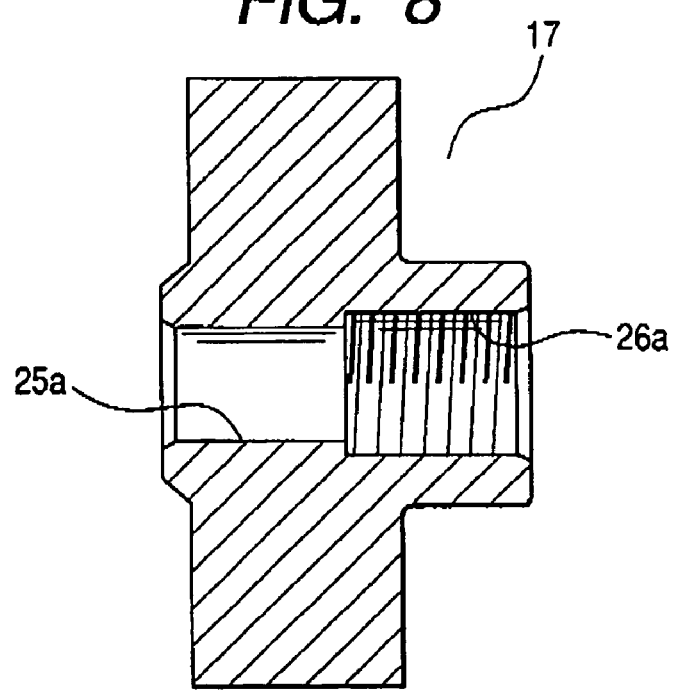
FIG. 8 is a sectional view of a boss showing Embodiment 4 of the invention.

Embodiment 4 will be explained in reference to FIG. 8. FIG. 8 is a sectional view of the boss 17 arranged between the output shaft 9 of the DC brush motor 1 for the electric power steering apparatus and the input shaft 24 of the gear box 3 and the boss 17 of Embodiment 4 is shown by the boss 17 fixed to a side of the input shaft 24. The other constitution is constructed by a constitution similar to those of Embodiment 1 through Embodiment 3 and a detailed explanation will be omitted. In FIG. 8, the boss 17 is constituted by an integrated product formed by a sintered member, includes an inner diameter portion 25a for being press-fitted to the input shaft 24 and a spline hole 26a provided on the side of the output shaft 9 of the DC brush motor 1 for being connected to the spline and is constituted to provide the function of transmitting the rotational force of the DC brush motor 1 from the output shaft 9 to the input shaft 24 by the boss 17 per se. The spline provided at the end portion of the output shaft 9 of the DC brush motor 1 is connected to the spline hole 26a of the boss 17 press-fitted to the input shaft 24 to transmit the rotational force.

As described above, according to the electric power steering apparatus of Embodiment 4, there is provided the boss 17 fixed to the side of the input shaft 24, and an effect equivalent to that of Embodiment 1 or Embodiment 2 can be achieved by constituting the weight rate (%) or the moment of inertia rate (%) of the boss 17 by that of Embodiment 1 or Embodiment 2. Further, the constitution of fixing the boss 17 to the output shaft 9 can reduce noise further effectively since in comparison with the constitution of fixing the boss 17 to the input shaft 24, the connecting portion of the spline or the like is not interposed.

Further, although according to the respective embodiments, an explanation has been given of the boss 17 including the spline, a connecting method of an Oldham type or the like connected by way of recessed and projected claw portions will naturally do.

What is claimed is:
1. An electric power steering apparatus comprising:
   a DC brush motor controlled by a control apparatus configured to compensate for an influence of an inertia, the DC brush motor comprising:
   an output shaft rotatably supported by a first bearing and a second bearing, the first bearing comprising an outer ring contained by a clearance fitting in an inner face of a bearing containing portion formed in a yoke having a bottomed cylinder shape, and the second bearing comprising an outer ring fixed to a housing to which an opening side of the yoke is fixed and an inner ring fixed by being pinched in an axial direction, and a boss arranged between the output shaft of the DC brush motor and an input shaft driven by the DC brush motor, fixed to an end portion of the output shaft which is projected from the second bearing in the axial direction, and for transmitting a rotational force of the DC brush motor from the output shaft to the input shaft by the boss, wherein a weight of the boss is made to be equal to or larger than 10% of a weight of a rotor of the DC brush motor.

2. An electric power steering apparatus comprising:

a DC brush motor controlled by a control apparatus configured to compensate for an influence of an inertia, the DC brush motor comprising:

an output shaft rotatable supported by a first bearing and a second bearing, the first bearing comprising an outer ring contained by a clearance fitting in an inner face of a bearing containing portion formed in a yoke having a bottomed cylinder shape, and the second bearing comprising an outer ring fixed to a housing to which an opening side of the yoke is fixed and an inner ring fixed by being pinched in an axial direction, and a boss arranged between the output shaft of the DC brush motor and an input shaft driven by the DC brush motor, fixed to an end portion of the output shaft which is projected from the second bearing in the axial direction, and for transmitting a rotational force of the DC brush motor from the output shaft to the input shaft by the boss, wherein a moment of inertia of the boss is made to be equal to or larger than 10% of a moment of inertia of a rotor of the DC brush motor.

3. The electric power steering apparatus according to claim 1, the boss is constituted by an integrated product formed by a sintered member or cold forging.

4. The electric power steering apparatus according to claim 2, the boss is constituted by an integrated product formed by a sintered member or cold forging.

5. The electric power steering apparatus according to claim 1, wherein the boss is constituted by fixing a providing portion to an outer periphery of the boss.

6. The electric power steering apparatus according to claim 2, wherein the boss is constituted by fixing a providing portion to an outer periphery of the boss.

7. The electric power steering apparatus according to claim 5, wherein the providing portion is constituted by interposing an elastic member to a portion of the providing portion.

8. The electric power steering apparatus according to claim 6, wherein the providing portion is constituted by interposing an elastic member to a portion of the providing portion.

9. The electric power steering apparatus according to claim 5, wherein the providing portion is constituted by an elastic member.

10. The electric power steering apparatus according to claim 6, wherein the providing portion is constituted by an elastic member.

11. The electric power steering apparatus according to claim 1, wherein the DC brush motor is attached to a column.

12. The electric power steering apparatus according to claim 2, wherein the DC brush motor is attached to a column.

13. The electric power steering apparatus according to claim 5, wherein the providing portion consists of a outer annular ring surrounding an inner peripheral ring, wherein the inner peripheral ring is formed of a viscoelastic material.

14. The electric power steering apparatus according to claim 6, wherein the providing portion consists of a outer annular ring surrounding an inner peripheral ring, wherein the inner peripheral ring is formed of a viscoelastic material.

15. The electric power steering apparatus according to claim 1, wherein the boss connects the output shaft and the input shaft so that they rotate at the same speed.

16. The electric power steering apparatus according to claim 2, wherein the boss connects the output shaft and the input shaft so that they rotate at the same speed.

* * * * *